(12) United States Patent
Cerniglia

(10) Patent No.: US 12,038,045 B2
(45) Date of Patent: Jul. 16, 2024

(54) LOW FRICTION GIB

(71) Applicant: Anthony Cerniglia, Wauconda, IL (US)

(72) Inventor: Anthony Cerniglia, Wauconda, IL (US)

( * ) Notice: Subject to any disclaimer, the term of this patent is extended or adjusted under 35 U.S.C. 154(b) by 263 days.

(21) Appl. No.: 17/619,972

(22) PCT Filed: Jun. 17, 2020

(86) PCT No.: PCT/US2020/038247
§ 371 (c)(1),
(2) Date: Dec. 16, 2021

(87) PCT Pub. No.: WO2020/257361
PCT Pub. Date: Dec. 24, 2020

(65) Prior Publication Data
US 2022/0299064 A1 Sep. 22, 2022

Related U.S. Application Data

(60) Provisional application No. 62/862,478, filed on Jun. 17, 2019.

(51) Int. Cl.
*F16C 29/02* (2006.01)
*B23Q 1/25* (2006.01)
(Continued)

(52) U.S. Cl.
CPC .............. *F16C 29/02* (2013.01); *B23Q 1/25* (2013.01); *B29C 45/17* (2013.01); *F16C 33/20* (2013.01);
(Continued)

(58) Field of Classification Search
CPC ...... F16C 29/004; F16C 29/005; F16C 29/02; F16C 29/12; F16C 29/126; F16C 33/20;
(Continued)

(56) References Cited

U.S. PATENT DOCUMENTS 2,593,230 A * 4/1952 Walter ................... B23Q 1/262
384/39
3,020,097 A 2/1962 Bullard
(Continued)

FOREIGN PATENT DOCUMENTS

GB 928433 A 6/1963
JP 02198730 A * 8/1990
(Continued)

OTHER PUBLICATIONS

International Search Report and Written Opinion, cited in corresponding PCT app No. PCT/US20/38247; dated Oct. 5, 2020; 8 pp.
(Continued)

*Primary Examiner* — Phillip A Johnson
(74) *Attorney, Agent, or Firm* — Lempia Summerfield Katz LLC

(57) ABSTRACT

A gib includes a metallic substrate having a first face and a second face and an attachment disposed on the metallic substrate. The attachment includes a first functional surface disposed on the first face of the metallic substrate. The first functional surface is configured as a bearing surface. The attachment may be formed of a fabric resin composite material.

12 Claims, 23 Drawing Sheets

(51) Int. Cl.
   *B29C 45/17* (2006.01)
   *F16C 33/20* (2006.01)
   *F16C 33/66* (2006.01)

(52) U.S. Cl.
   CPC .. *F16C 33/6696* (2013.01); *B29C 2045/1784* (2013.01)

(58) Field of Classification Search
   CPC .. F16C 33/24; F16C 33/6696; F16C 2322/29; B29C 45/17; B29C 2045/1784; B23Q 1/25; B23Q 1/42
   See application file for complete search history.

(56) References Cited

U.S. PATENT DOCUMENTS

| | | | |
|---|---|---|---|
| 3,353,875 A * | 11/1967 | Karge | F16C 29/0697 384/45 |
| 4,400,099 A | 8/1983 | Ehrentraut | |
| 6,120,279 A | 9/2000 | Vovan | |
| 8,371,842 B2 | 2/2013 | Li | |
| 10,184,520 B2 * | 1/2019 | Drew | F16C 33/103 |
| 2004/0131290 A1 | 7/2004 | Frasch et al. | |
| 2018/0155510 A1 | 6/2018 | Niessner et al. | |
| 2019/0118513 A1 | 4/2019 | Kornfeld et al. | |

FOREIGN PATENT DOCUMENTS

| | | |
|---|---|---|
| JP | 2018087637 A | 6/2018 |
| KR | 101910155 B1 | 10/2018 |

OTHER PUBLICATIONS

Micarta (Wikipedia), https://en.wikipedia.org/w/index.php?title=Micarta&oldid=891274825, Apr. 2019; 3 pp.

European Search Report cited in European patent application No. EP 20 82 5724; dated Jun. 12, 2023; 8 pp.

Office Action cited in corresponding Japanese patent application No. 2021-574966; May 28, 2024; 8 pp.

* cited by examiner

LOW FRICTION GIB

RELATED APPLICATION DATA

This application is a U.S. national stage of and claims priority to prior filed international application no. PCT/US2020/038247 filed Jun. 17, 2020 and entitled "Low Friction Gib", and which claims priority to U.S. provisional application No. 62/862,478 filed Jun. 17, 2019 and having the same title. The entire contents of these prior filed applications are hereby incorporated by reference herein.

BACKGROUND

1. Field of the Disclosure

The present disclosure relates to manufacturing componentry and processes, and more specifically to a construction of a gib or way and a method for eliminating applied lubricants and their resultant contamination within the production environment.

2. Description of Related Art

Manufacturing componentry and the associated processes utilize what are referred to in industry as gibs or ways, which typically require applied lubricants. The applied lubricants can result in contamination within the production environment. One such production environment and process is that of injection molding. Injection molding is widely used to produce an innumerable variety of products from simple toys and cell phone cases to water bottle preforms, medical components, automotive devices, and the like. While this disclosure references injection molding processes, it should be noted that other manufacturing processes would similarly benefit from the elimination of applied lubricants. Applied lubricants have many negative attributes, such as attracting particulate and airborne contaminants, reduced performance over time, limited service life, migration, and general overall maintenance.

As with many manufacturing processes, there are certain subcategories within the general and broader description. One such subcategory would be that of clean room manufacturing. Clean room manufacturing, as the name suggests, is a controlled environment where shoe covers, lab coats, face coverings, goggles, beard and hair nets, and the like are required for all personnel to reduce organic contaminants. Similarly, production tooling and equipment required to operate within clean rooms must be configured to attempt to adhere to the clean room protocols of minimizing contaminants.

Many production mold tools have motionable components that travel laterally or slide as the mold tool opens or closes. The motionable components are commonly referred to as slides or side actions. These slides are often driven mechanically by what is known to the industry as an angle pin or other similar names, depending on the region of manufacture. Regardless of the mechanism or the method that drives the mechanism, clean room protocols demand that minimal lubrication be used during the production process to minimize the risk of lubricant migration to production parts. Migration of lubricants can create part rejects that could be categorized as aesthetic or functional. Aesthetic rejects affect or harm the appearance or visual aesthetic of the final product. Functional rejects affect or harm the function or performance of the final product. Typically, functional rejects could be catastrophic if not discovered during production. An example of an aesthetic reject may be where an injection molded housing or other part requires a secondary process such as painting or other applied coating to address a defect. An example of a functional reject may be an automotive sensor that has an electrical contact to deploy an automobile airbag where the contact is rendered inoperative or defective.

Mold tooling, when placed in a clean room environment, is often lubricated with FDA approved food grade or edible grease. These lubricants typically have limited performance characteristics and are not suited for certain mold or industrial conditions. Such limitations can contribute to migration and degradation. Lubricant migration can be a result of any one or a combination of the following: application method; lubricant type; thermal condition; acceleration; force, linear motion; rotary motion; or orientation that the lubricant may be subjected to. Any migrating lubricant, in any of its forms, located on the molded product would create a reject. The parts intended end use would determine if the reject was catastrophic or aesthetic.

Regardless, rejected parts, often set into motion a root cause analysis, discovery, and corrective action process. This process, typically referenced as an "8 discipline report", requires a team to study the nature of the defect and analyze how the defect occurred. The final discipline on this type of report, while phrased in different ways, usually requires that a solution be provided to ensure that the reject from this cause cannot be or is not repeated. Currently, the only solution for a defect from migrating lubricant is that all parts are subjected to a 100% inspection and or cleaning process policy.

Applied lubricants also have operational deficiencies. Applied lubricants are utilized to minimize the risk of galling. Galling is a common industrial nemesis. Galling is a term used to describe catastrophic failure between at least one motionable component as it translates across a secondary component surface. Such motion and surface to surface contact generating localized frictional heat, which may cause one component to significantly soften and approximate welding to the mating component. The very use of lubricants in industry is to facilitate motion without failure of the componentry. There is no shortage of "rule of thumb" material selections, hardness recommendations, heat treatment specifications, approved or preferred coatings, depositions, lubrication films, aerosol lubricants, oils, pastes, dry or solid lubricants, or other such materials, that are used at any technically proficient industrial manufacturer.

Furthermore, these applied lubricants are not permanent in the sense that they require reapplication as their performance diminishes and degrades over time. The frequency of reapplication depends on the environment to which the applied lubricants are subjected. Certain hard coatings lend themselves to chipping and cracking under higher loads or when inadvertently impacted. Additionally, these coatings require that their thickness be accounted for when manufacturing and in the process to which the coatings are to be used. Usually, this requires an over-thickness application and another finishing process to properly size the finished part.

These extra steps and the process alone are time consuming and costly. Soft coatings, while forgiving to high impacts, typically wear prematurely, which reduces component life cycles. To reference back to applied lubricants, these products inherently attract airborne dust and particulate. As the lubricant loads with contaminants and particulates, it becomes necessary to schedule a preventive maintenance process whereby the tooling must be removed from production, disassembled, and cleaned to remove all degraded and contaminated lubricants. New lubricant must then be applied and then the tooling must be reassembled. This process is costly with respect to, but not limited to, time, i.e., lost or down time, personnel, solvents, and equipment to perform the preventive maintenance. Additionally, there is added risk of damage to componentry during the necessary process steps, including but not limited to, disassembly, cleaning, reassembly, and the like. What is even more costly is the lost production time of manufacturing. A preventive maintenance procedure can cost tens of thousands of dollars. The lost manufacturing revenue could be twice or three time that amount, or more, should the reassembly be deficient in some manner in so much as to warrant that the disassembly and reassembly process be repeated before production can resume.

It is further important to describe the wide-ranging scope of injection mold tooling and certain requirements for proper function that exist beyond the aforementioned clean room and to further explore the operating parameters for injection molds. Operating parameters are largely determined by the type of resin that is processed in the mold. Some resins require that the mold temperature be room temperature or less, while other resins need a mold temperature of 450° F. or greater. Some molds are very small parts, such as for molding hearing aid componentry, whereas other molds are for rather large parts, such as for molding auto, truck, and farm implement parts. Appreciating these ranges helps to understand that selecting a lubricant, coating, or other friction reducer, must be done with careful consideration for the specific conditions of a given motionable component within tooling.

Considering application of current materials and methods, a motionable mold component for making a hearing aid part may only need a very light grease for lubrication, whereas a motionable large automotive tool may require a high-pressure grease to support the higher load due to the mass of the motionable mold tool component. In either case, the need to lubricate, considering all of the above-mentioned deficiencies, is still apparent. Expanding on the temperature ranges that molds operate within, and specifically higher heat molds, certain lubricants may have heat tolerance ranges that satisfy production temperatures. However, these high temperature lubricants have other performance criteria that may not be truly well suited to molds.

Injection molds are constructed with great precision and operational clearances are minimal. These clearances are more applicable to oil type lubricants rather than grease type lubricants. However, plastic injection molds do not have a containment system to allow for the use of oil. Additionally, oils migrate very quickly as their viscosity deviates through a range of temperatures. Motionable components may also need to be located where gravity would draw migrating lubricants toward the mold cavity. It is for these very reasons that grease type lubricants rather than oils are used. These types of lubricants may be applied to a thickness, or thinness, to be more precise, that inhibits their ability to lubricate as intended. As stated, when grease type lubricants are spread sufficiently thin, and subjected to higher temperatures for extended time periods, like that of certain injection molds, these lubricants will rather quickly degrade and not perform as required. Thus, periodic stoppages may be required to attend to the degraded lubricant and prevent catastrophic galling of the motionable componentry.

SUMMARY

There is a need in industry for a viable solution to motionable components that allows function without applied lubricants or special coatings while eliminating the risk of catastrophic galling failure. The disclosed solution can satisfy the temperature and pressure ranges that a motionable component could be required to operate within while eliminating applied lubricants. The disclosed solution thus solves the aforementioned deficiencies.

In one example according to the teachings of the present disclosure, a low friction gib includes a metallic substrate having a first face and a second face and includes an attachment disposed on the metallic substrate. The attachment includes a first functional surface disposed on the first face of the metallic substrate. The first functional surface is configured as a bearing surface.

In one example, the attachment can be formed of a material configured to reduce friction between the first functional surface and another adjacent component movable relative to the first functional surface.

In one example, the attachment can be formed of a fabric resin composite material.

In one example, the attachment can be a fabric resin composite which can include a second functional surface disposed on the second face of the metallic substrate. The second functional surface can be configured to be disposed adjacent to the first functional surface.

In one example, can be configured to facilitate or guide axial or linear motion relative to the gib when the attachment or the fabric resin composite interacts with one or more motionable components without using a lubricant.

In one example, the first functional surface can be configured as a guide surface and a second functional surface can be configured as a retention surface.

In one example, the gib can be for an injection mold tool.

In one example, the attachment can be a fabric resin composite, which can include edges configured to avoid contact with the motionable components.

In one example, the metallic substrate and a fabric resin composite attachment can be joined with a plurality of mechanical fasteners.

In one example, the metallic substrate and a fabric resin composite attachment can be bonded with an adhesive material.

In one example, there may be no direct contact between the metallic substrate and the motionable components as a result of the attachment being disposed therebetween.

In one example, the metallic substrate can include a third face disposed opposing the first functional surface. The second functional surface can be configured to be flush with the third face of the metallic substrate and an edge of the second functional surface can be configured to be coplanar with the third face of the metallic substrate.

In one example, the first functional surface and the second functional surface can be configured as one continuous form.

In one example according to the teachings of the present disclosure, a method of reducing contamination within a manufacturing environment includes the steps of using a gib as a guiding surface and a retention surface for motionable components. The gib includes a metallic substrate and a fabric resin composite disposed as the guiding surface and as the retention surface on the metallic substrate. The method includes operating the motionable components without the application of any lubricants to the gib and the motionable components.

The present disclosure provides a common industrial device, and more specifically what is generally known in the industry as a gib. Gibs are devices, when used in pairs, that are typically installed in machinery, such as in mold components, to function as a guide or a method to retain and guide. Gibs are often used in pairs to perform their intended function. Gibs have been in use for decades and are ever developing in scope due to specific environment and application necessities. While this disclosure is further directed to injection mold tooling, its adaptation to other industrial applications should be noted. The present disclosure eliminates the need for lubricants as they relate to gibs and motionable elements within a manufacturing environment.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present disclosure will become apparent upon reading the following description in conjunction with the drawing figures, in which.

DETAILED DESCRIPTION OF THE DISCLOSURE

The disclosed gibs solve or improve upon one or more of the above-noted and/or other problems and disadvantages with prior know gibs and motionable machine components.

Figure 1:
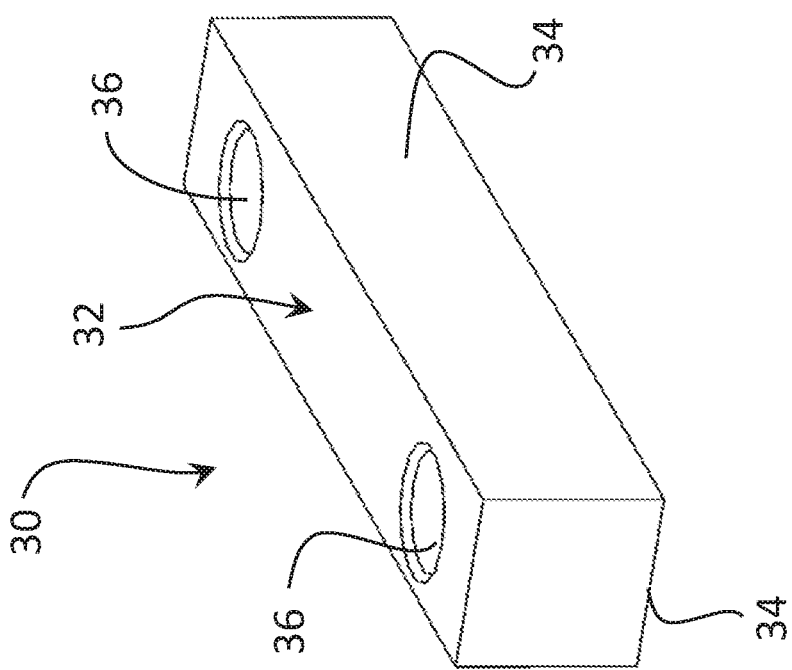
FIG. 1 shows a perspective view of one example of a prior art or known gib.

FIG. 1 shows one example of a conventional or prior art gib 30. The gib 30 in this example has an elongate rectangular body 32 and can define one or more bearing surfaces 34 on its exterior. The body 32 may include one or more holes 36 utilized to fasten the gib 30 to another tool or machine element. In this example, each bearing surface 34 is a flat or planar surface. Each bearing surface 32 can be configured and disposed to guide, retain, or combine guidance and retention functions when linear motion of a non-cylindrical tool or machine element is required. The bearing surfaces 34 would contact similarly flat or planar surfaces on the tool or machine element. In the prior art, applied lubricants would be utilized between each of the corresponding contact surfaces of the gib and the tool or machine element.

The disclosed gibs and methods expand the functionality of a conventional gib by providing a comprehensive solution to eliminate the need for and the application of a lubricant in any of its forms, whether it be solid, film, paste, liquid, dry, aerosol, or another lubricant type. Further, the disclosed gibs and methods eliminate the need for any coating's, plating's, treatments, or the like of any kind whatsoever on the gib or the tool or machine element, while also eliminating galling.

This disclosure is directed to a universal gib product that performs in these differing environments as related to, but not limited to, operating temperatures, varying mass support, cleanliness, and the like without any lubricant, special coating, or production stoppages. The disclosed gib product is a superior solution and is novel to the industry.

Figure 2:
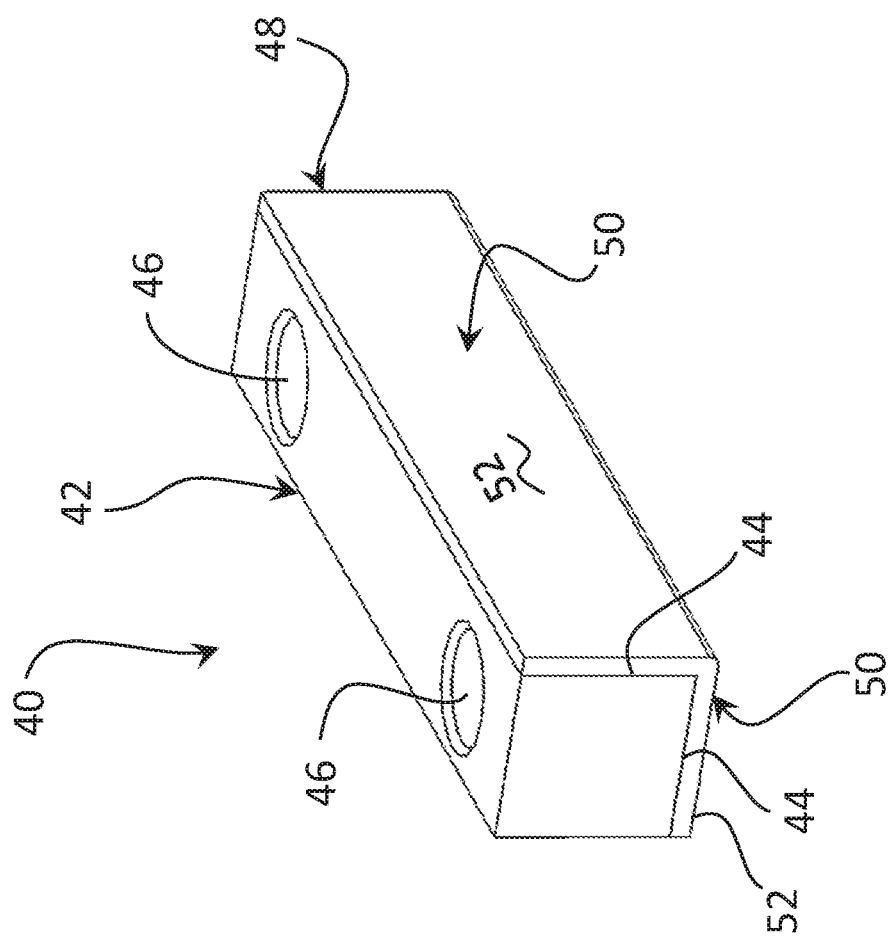
FIG. 2 shows a top perspective view of one example of a gib constructed in accordance with the teachings of the present disclosure.
Figure 3:
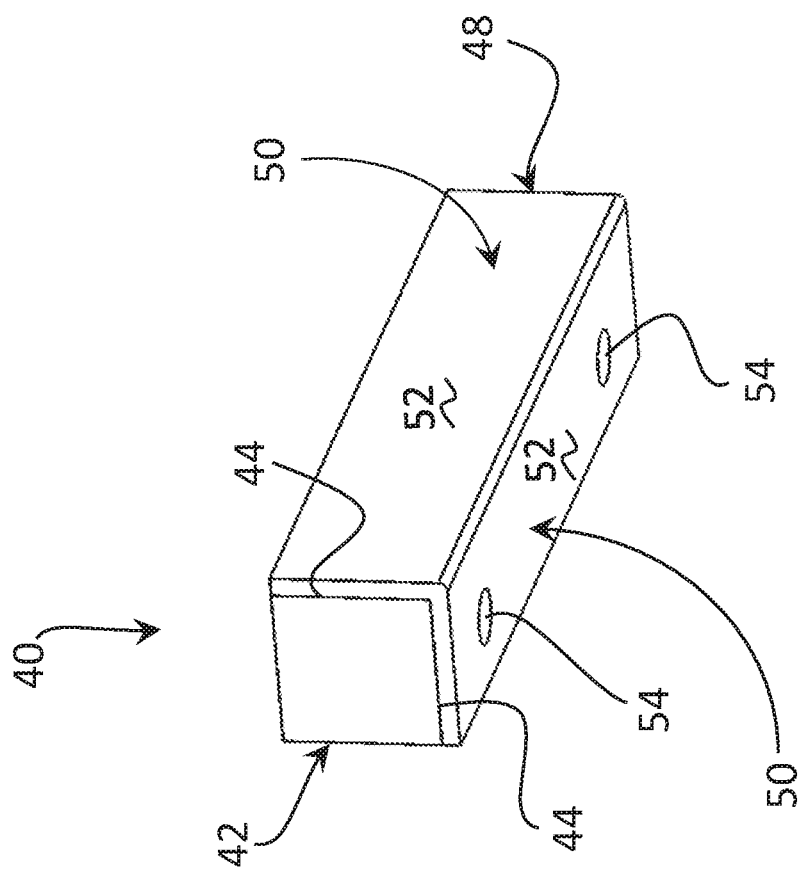
FIG. 3 shows a bottom perspective view of the gib in FIG. 2.

FIGS. 2 and 3 illustrate one example of a gib 40 constructed in accordance with the teachings of the present disclosure. The gib 40 in this example is essentially the same as the gib 30 in shape and includes a body 42 with contact faces 44 and fastening holes 46. In each of FIGS. 1 and 2, the gib body 32 and 42 can be a metallic substrate for strength, rigidity, and durability. In this example, the gib 40 also includes an attachment 48, i.e., a fitment, adaptor, or the like, attached to the body 42. The attachment 48 can be configured to overlie at least each contact face 44 of the body. Thus, in this example, the attachment 48 includes two elongate rectangular plate-like or planar sections 50 joined to one another and having an L shape in cross-section. The attachment 48 includes an outer facing surface 52, one on each of the sections 50, that are exposed when attached to the body 42 of the gib 40. The exposed surface 52 are intended to provide a low friction contact surface or a friction reducing characteristic when in contact with a corresponding surface of a tool or machine element.

In one example, the attachment 48 can be formed of a fabric resin composite material. The fabric resin composite material can provide friction reducing qualities while also having excellent wear characteristics and strength or compression characteristics. The attachment can vary in size and shape, depending on the size and shape of the body and the tool or machine element against which it will bear during use. The attachment may be configured to overlie only one surface of the gib body or may be configured to overlie more than two surfaces of the gib body, depending on the tool or machine application for which it is intended. The gib 40 is configured to achieve lubricant free operation and robust support for industry by combining the metallic gib substrate for strength and rigidity with the fabric resin composite for the functional surfaces.

With reference to FIG. 3, the attachment 48 may have openings 54 in one of the sections 50. The openings 54 can be configured to coincide with the fastening holes 46 in the body of the gib 40 and to allow a fastener to pass through the gib 40 to secure the gib to a tool or machine element. The gib 40 or gibs, when used within injection mold tooling, may in fact retain, guide, and function as a bearing, typically on two surfaces. The gib 40 in this example is shown to have two functional or bearing surfaces, i.e., the outer surfaces 52 of the attachment 48 on the body 42. Each outer surface 52 may be identified as a guide surface and/or a retention surface in that each may guide movement of a motionable tool or machine element relative to the gib, and each may retain relative positioning of one part to another part within the tool or machine, including the motionable tool or machine element. In other embodiments and examples, the gib may have only one bearing or functional surface or may have more than two bearing or functional surfaces. These surfaces may be configured to be adjacent when used with motionable componentry. For reference, each of these functional surfaces may be identified as the retention surface and/or the guide surface.

Figure 4:
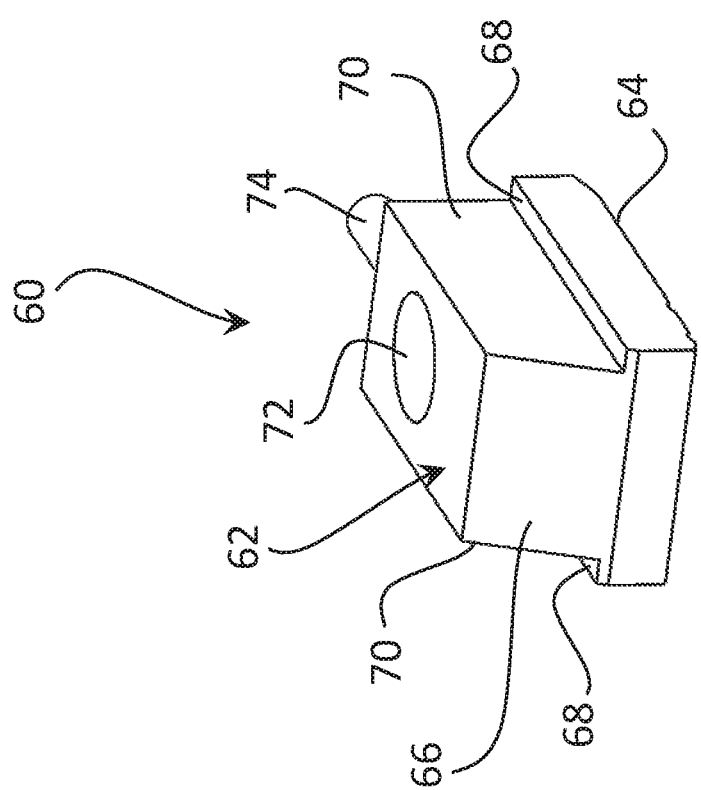
FIG. 4 shows a top perspective view of one example of a slide constructed in accordance with the teachings of the present disclosure.

FIG. 4 illustrates an example of a tool slide 60 or side action constructed in accordance with the teachings of the present disclosure. The slide 60 may be equated to the aforementioned motionable tool or machine element. A slide or side action is a common component known in the injection mold industry. A slide is configured as a motionable component in a mold. The slide 60 may also be formed as a metallic substrate, similar to the gib body 42. In this example, the slide 60 has a body 62 with a wider base part 64 and a narrower upper part 66. The difference in width across the body 62 between the base part 64 and the upper part 66 creates an upward facing step or shoulder, i.e., a heel 68 on the base part. The upper part 64 of the body 62 adjacent and above the heels 68 may define opposed slide bearing surfaces 70. In this example, the body 62 of the slide 60 may also include an angle pin bore 72 formed downward or generally vertically through the body, but at an angle to vertical, as discussed below. The slide 60 also may have a coring pin 74 extending horizontally from one end of the body 62, also as discussed below.

Figure 5:
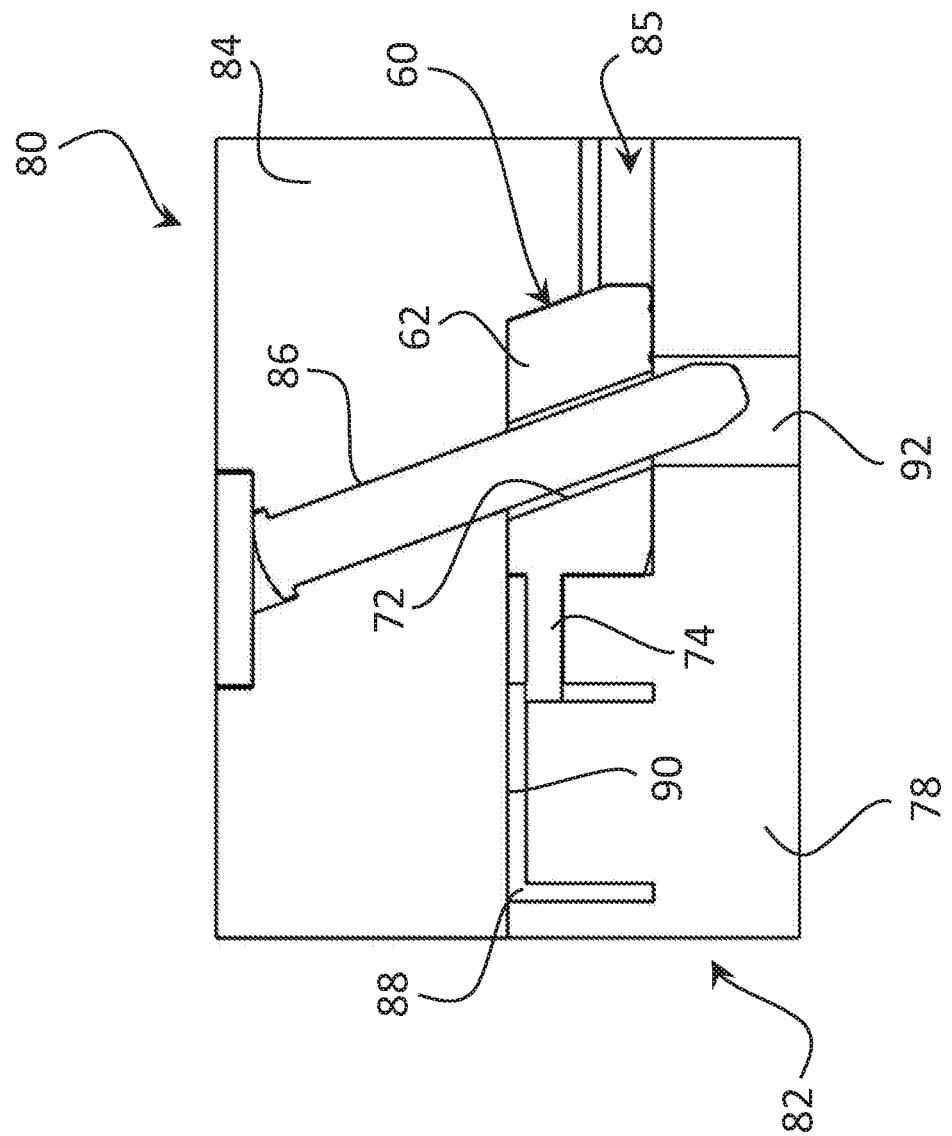
FIG. 5 shows a cross section view of one example of a portion of a mold incorporating the slide of FIG. 4 and having an angle pin in accordance with the teachings of the present disclosure, the mold being shown in a closed position.
Figure 6:
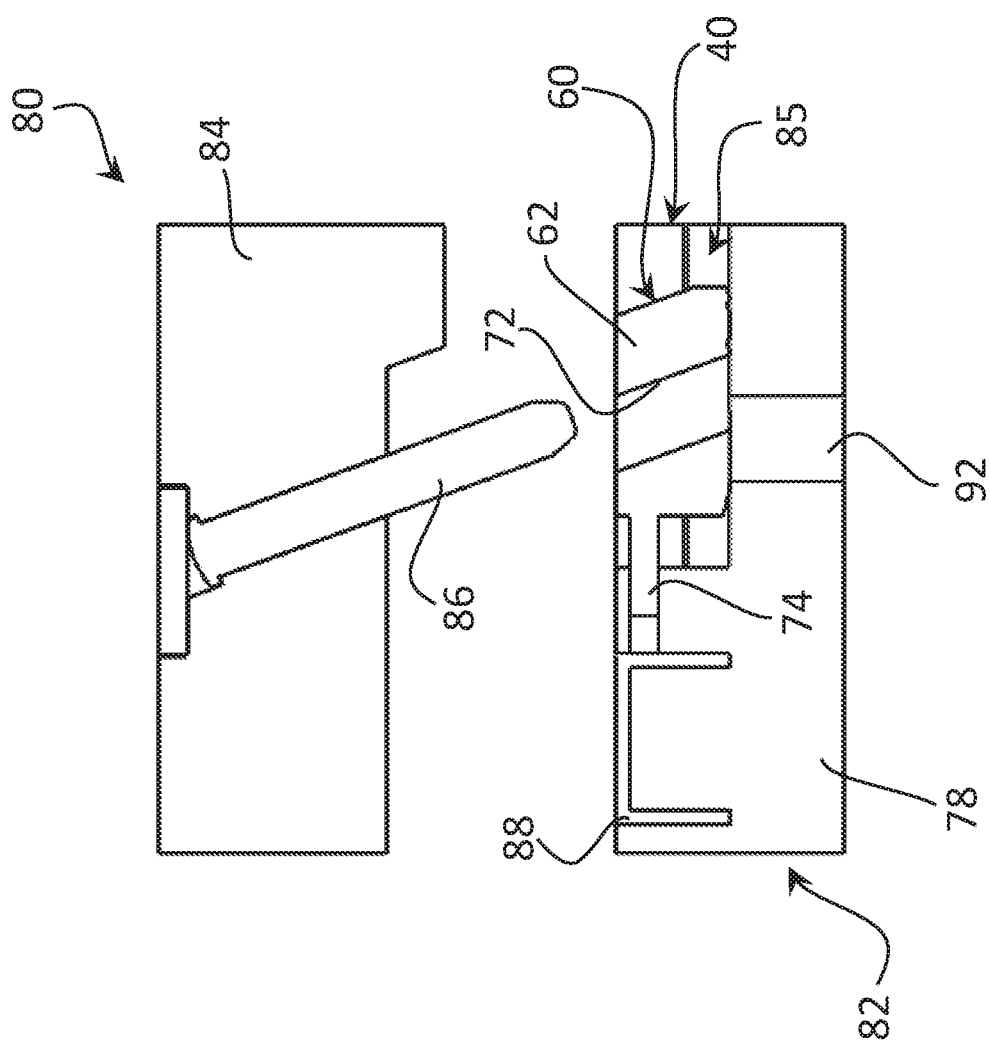
FIG. 6 shows the cross section view of the mold portion of FIG. 5, including the angle pin and the slide, but with the mold in an opened position.

FIGS. 5 and 6 show side cross-section views of one example of a generic, simplified mold 80 constructed in accordance with the teachings of the present disclosure. The mold 80 in this example incorporates the slide 60 of FIG. 4 and a pair of the gibs 40 of FIGS. 2 and 3. Many injection molded parts require a side action or a slide to remove coring or cavity geometry from the ejection path of a molded part. A common method of actuating the lateral motion of the movable coring or cavity geometry is by providing that element on the slide, and then utilizing what is known in the industry as an angle pin to move the slide, and thus the movable coring or cavity geometry. Other common terms for such angle pin parts are cam pin, horn pin, pecker pin, or the like, depending on the region of manufacture.

Figure 7:
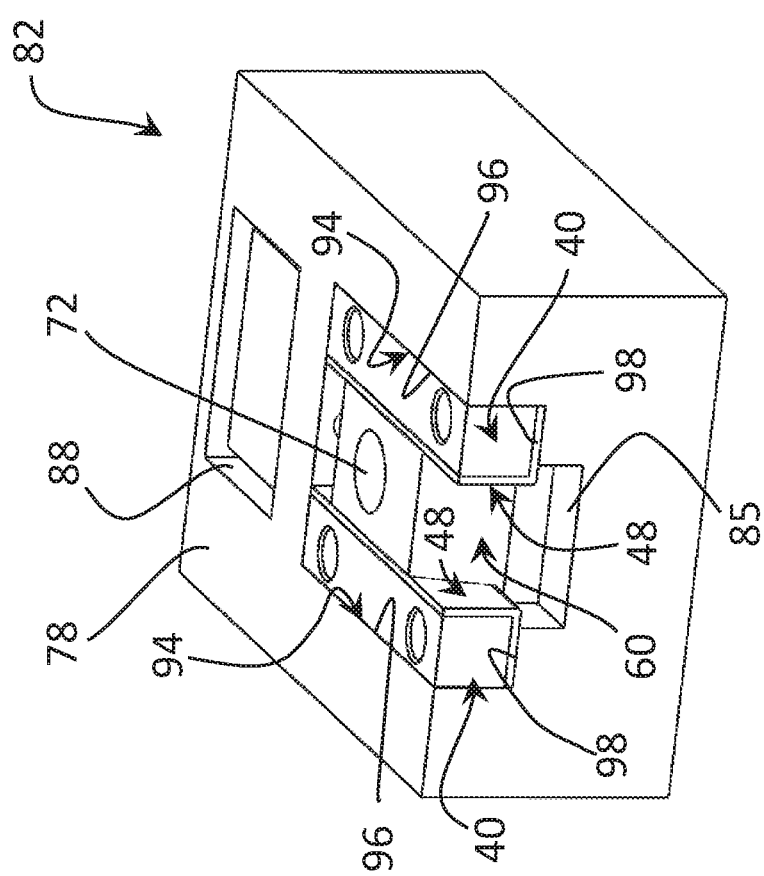
FIG. 7 shows a top perspective view of one example of a housing assembly of a mold including a pair of gibs such as shown in FIGS. 2 and 3 and a slide such as that shown in FIG. 4, the housing assembly constructed in accordance with the teachings of the present disclosure.

Referring to FIGS. 5 and 6, the mold 80 in this example includes a lower platen 78 as a part of a housing assembly 82 and an upper platen 84. FIG. 7 shows a top perspective view of the housing assembly 82. In this example, the slide 60 is carried in a slide 85 recess in the lower platen 78 of the housing assembly 82. An angle pin 86 is fixed at an angle to the upper platen 84. The angle pin 86 matches the angle or orientation of the angle pin bore 72 through the body 62 of the slider 60. The angle pin 86 is received in the angle pin bore 72 with the mold 80 in the closed position of FIG. 5. The lower platen 78 of the housing assembly 82 defines a substantial portion of a mold cavity 88 therein and a surface 90 of the upper platen 84 closes the mold cavity 88 when in the closed position of FIG. 5. In the closed position, the slide 60 is slid or moved to the left in FIG. 5 and the coring pin 74 extends into the mold cavity 88 to form a hole in a molded part formed in the cavity. In the closed position, the free end of the angle pin 86 passes completely through the slide body 62 and seats in a pin recess 92 in the lower housing 82.

Referring to FIG. 6, when the mold 80 is opened, the upper platen 84 is lifted or raised. The angle pin 86 is thus also lifted vertically along with the upper platen 84. The vertical motion of the angle pin 86, in combination with the orientation of the angle pin and angle pin bore 74 not being parallel or perpendicular to the vertical motion, causes the slide 60 to be moved to the right in FIG. 6. The movement of the slide 60 withdraws the coring pin 74 from the mold cavity 88. Thus, a molded part can be removed from the cavity 88 without interference from the coring pin 74.

With reference to FIG. 7, the slide 60 is received in the slide recess 85 of the lower platen 78 and can slide horizontally there along toward and away from the mold cavity 88. The slide recess 85 includes pockets 94 along opposed sides of the recess. The pockets 94 each have a side surface 96 defining a width of the pocket and have a bottom surface 98 defining a vertical depth of the pocket. The pockets 94 are sized and configured to receive the gibs 40 with the slide 60 disposed between the gibs. Fasteners (not shown) can be used to secure the gibs 40 through the fastener holes 46 to the bottom surfaces 98 of the pockets 94. The width of the bottom surfaces 98 and the spacing between the side surfaces 96 position each gib 40 such that a portion of the downward facing bearing surfaces 44 and outer surfaces 52 extend inward beyond the pockets and into, i.e., overhanging the recess 85. The size or width of the overhang of each gib 40 is sized to correspond to the width of the heels 68 on the slide 60.

Figure 8:
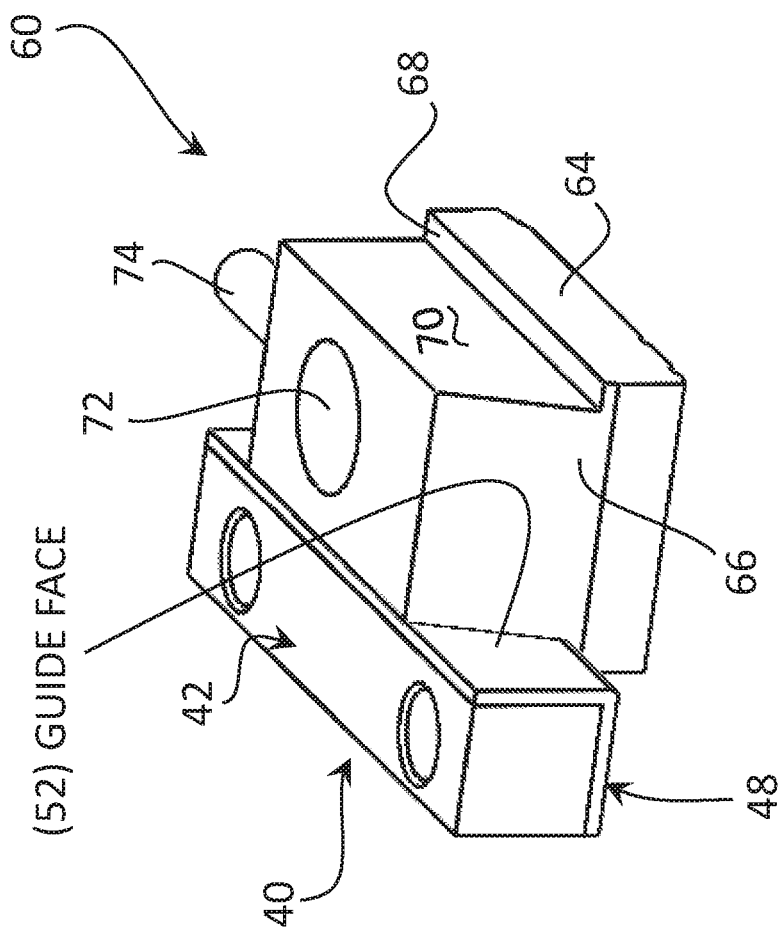
FIG. 8 shows a top perspective view of a portion of the housing assembly of FIG. 7, including one of the gibs and the slide in accordance with the teachings of the present disclosure.
Figure 9:
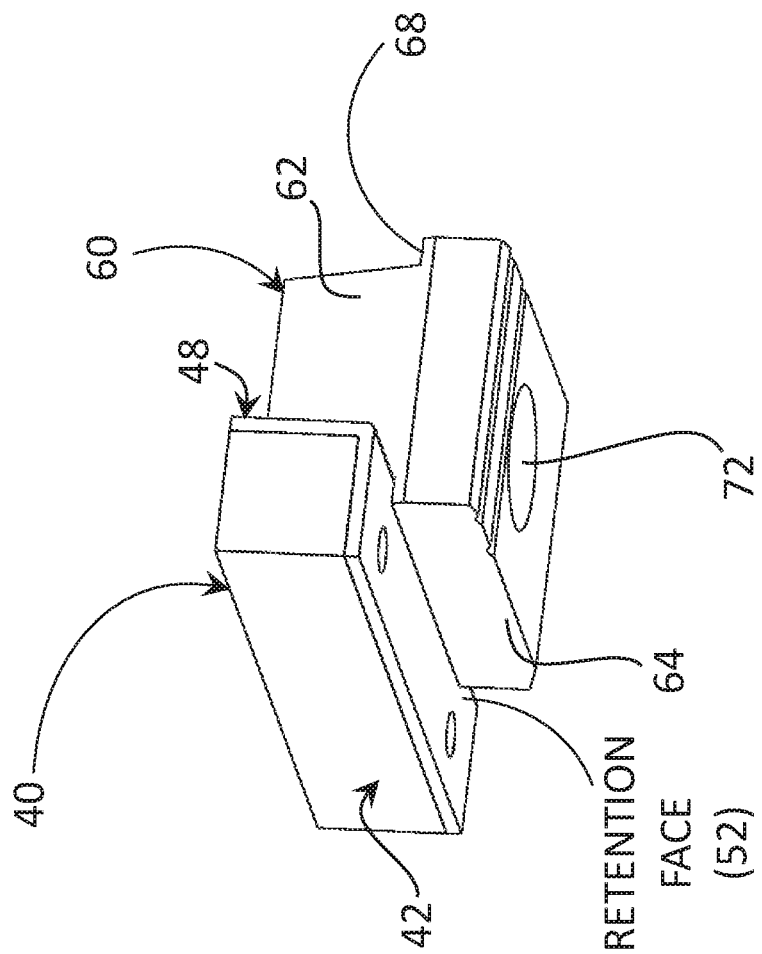
FIG. 9 shows a bottom perspective view of a portion of the housing assembly in FIG. 7.
Figure 10:
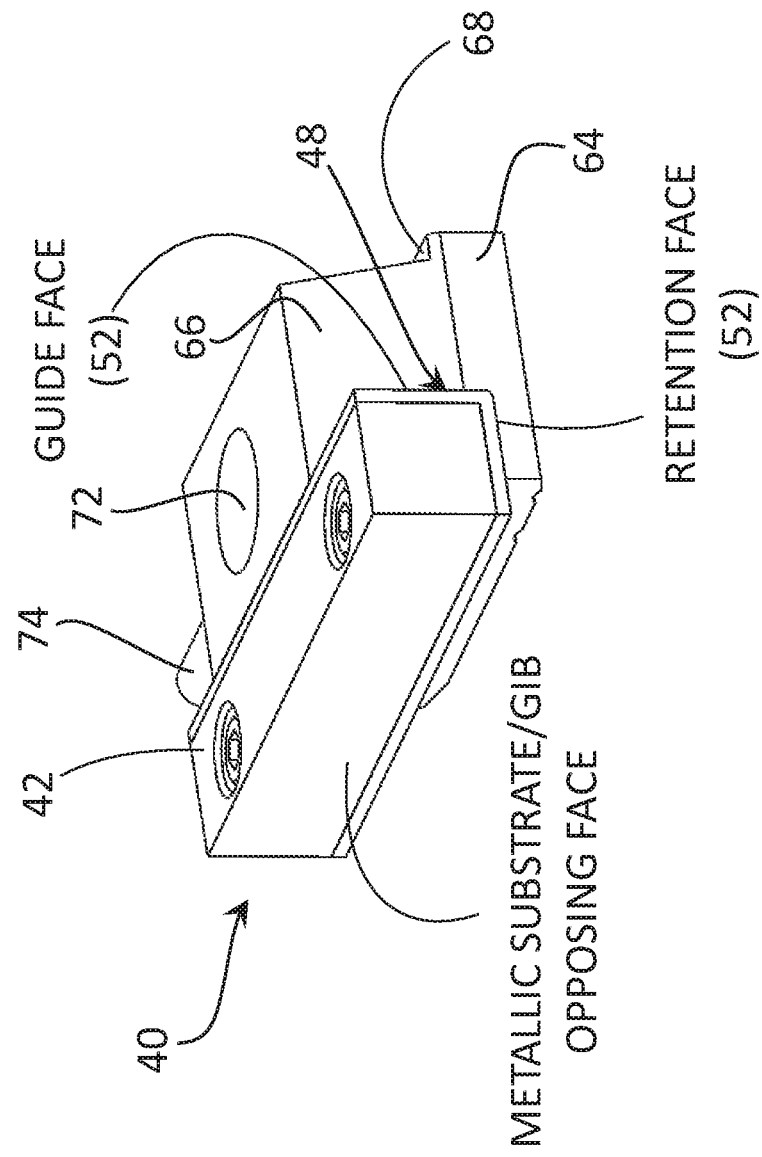
FIG. 10 shows a perspective view of one example of a gib and a slide, such as that in FIGS. 8 and 9, in accordance with the teachings of the present disclosure.

With reference to FIGS. 8-10, the attachment 48 is positioned between the gib body 42 and the surfaces of the slide 60. More specifically, the overhanging portion of the downward facing outer surface 52 of one section 50 of the attachment 48 on each gib 40 bears against a corresponding heel 68 on the slide 60. This portion of each attachment 48, along with the gib body 42, vertically retains the slide 60 within the slide recess 85 and also provides a low friction bearing surface (attachment surface 52 over gib surface 44) between the gib body 42 and the respective surface of the heel 68. The entirety of the inward facing outer surface 52 of the other section 50 of the attachment 48 on each gib 40 bears against a corresponding side bearing face 70 of the upper part 66 of the slide body 62. This portion of each attachment 48, along with the gib body 42, laterally retains the slide 60 within the slide recess 85 and also provides a low friction bearing surface (attachment surface 52 over gib surface 44) between the gib body 42 and the respective side bearing surface 70 of the slide 60. Thus, as noted above, the gib 40, including the low friction attachment 48, provides retention and guide functionality.

As the angle pin name suggests, the angle pin 86 is installed at an angle relative to the separable motion of the mold to translate the slide 60 for releasing the coring pin 74 from the molded article. As the angle pin 86 engages the slide 60, there is resistance to the lateral motion of the slide, typically but not always, resulting from surface tension of cured plastic resin adhering to the slide geometry. See again FIGS. 5 and 6. Once the contact of the heels 68 with the retention or overhang surface of the gib 40 is made as the angle pin 86 rises, lateral motion of the slide 60 is achieved to facilitate release from the molded article. As a result, the retention or overhang surfaces are configured as one of the functional surfaces of the gibs 40. In the arrangement shown in FIGS. 5-10, the outer surface 52 on the downward facing section 50 of the attachment 48 may be described primarily as the retention surface and the outer surface on the inward facing section of the attachment may be described primarily as the guide face, as depicted in FIG. 10.

The gib 40 disclosed in this example is typically used in pairs or multiples to facilitate slide motion. Each gib 40 of the pair of gibs includes a retention surface. The slide 60 includes a heel 68 configured to make intimate contact with the retention surface of the gib 40. The heel and gib retention surfaces are configured to allow lateral motion of the slide relative to the gib and toward and away from the cavity 88 of the mold 80. The second functional surface of the gib 40, the guide face, is adjacent the first functional surface of the gib, the retention face. The guide face guides the slide 60 as it is motioned during the molding sequence.

Figure 11:
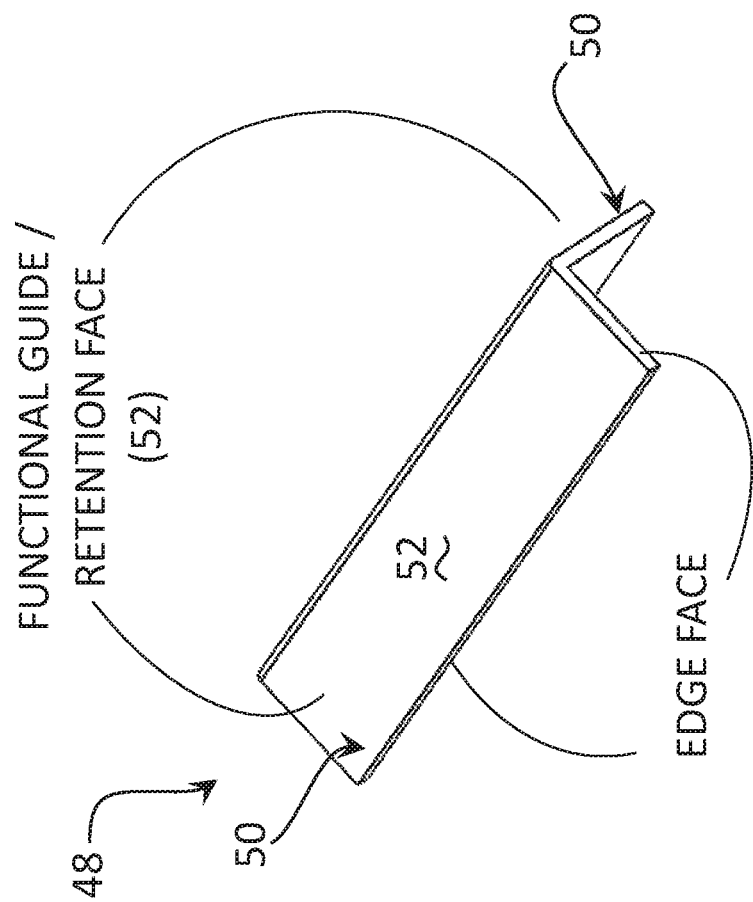
FIG. 11 shows a perspective view of one example of an attachment formed of a fabric resin composite and for the gib in FIGS. 2, 3, 8, and 9 and in accordance with the teachings of the present disclosure.

FIG. 11 illustrates one example of the attachment 48, removed from the gib substrate, and including the adjacent functional faces 52 of the sections 50. In this example, the attachment 48 is formed of a fabric resin composite and attached to the rigid gib substrate or body 42. Composite materials, of the fabric and resin type, have certain performance characteristics about their faces. Such materials typically lack those characteristics on their edges. When acknowledging the functional faces 44 of the gib 40 and functional faces 52 of the fabric resin composite attachment 48, it becomes apparent that the edge faces of the fabric resin composite is positioned in such a way that excludes them from having contact in any manner with the motionable component.

With this full and complete understanding of the gib construction and function, and, composite functional face orientation, it should now be evident that the gib of the described structure, as disclosed herein, improves on known or existing gib technology and eliminates the need for lubricants during use. A metallic substrate for the gib is required or preferred for industrial strength and rigidity. The shape and configuration of the gib substrate or body can vary according to the needs of a given application. The number of bearing (i.e. retention and/or guide) surfaces can vary from 1 to N, also according to the needs of a given application. The compatible shape and configuration of the attachment can thus also change to accommodate the gib substrate. The attachment can vary in shape to provide the desired surface overlay of the bearing surfaces on the gib substrate.

The disclosed fabric resin composite attachment eliminates the need for lubrication. The fabric resin composite material provides functional faces that may or should be formed in a manner such that they are uninterrupted. Thereby, the edge faces may be excluded from interacting with the motionable component. The functional faces 52 may be of one continuous, contiguous, or monolithic form. It is possible that other friction reducing materials may be utilized for the disclosed gib attachment in place of the disclosed fabric resin composite. The materials should be suitable for the intended manufacturing environment and for providing the desired friction reducing characteristics, while eliminating the need for applied lubricants.

The low friction gib solution as presented in this disclosure has been described for utility with respect to obvious performance enhancements over current methodologies. However, the disclosed gib allows motionable components, slides, and other such tool or machine components, to be produced from alternate materials that are currently avoided and/or have yet to be considered. The disclosed gib allows the alternate materials to be developed as useable materials for motionable components without risk of galling or sticking, which might otherwise cause catastrophic failure in production. The disclosed gib eliminates the need for maintenance respective of lubricant application, preventive maintenance requiring disassembly, cleaning, reassembly and the earlier noted risks and costs thereof. The disclosed gib also eliminates the need for providing the gib substrate with exotic coatings and plating materials, which are quite costly in many respects beyond the actual application costs.

Referring again to FIG. 10, the metallic substrate and the formed fabric resin composite attachment may be secured to one another with mechanical fasteners, such as one or more rivets, bonding adhesives, or the like. In one embodiment, the retention surface may be configured such that its exposed edge extends fully to be coplanar with the metallic substrate face that opposes the guide face. Extending the fabric resin composite form in this manner, while providing clearance for the gib mounting fasteners, may assure that the fabric resin composite remains in place should a bonding adhesive or mechanical fastener fail. The fasteners securing the gib to the slide will retain the attachment in place between the gib body and slide.

FIGS. 12-23 show a number of examples of different gib configurations and different mechanical fasteners used to bond the metallic substrate and the formed fabric resin composite attachment according to the teachings of the present disclosure. These examples are provided merely to show that the gib size, shape, configuration, and the like may be changed, and that the attachment may also be changed accordingly within the spirit and scope of the disclosure.

Figure 12:
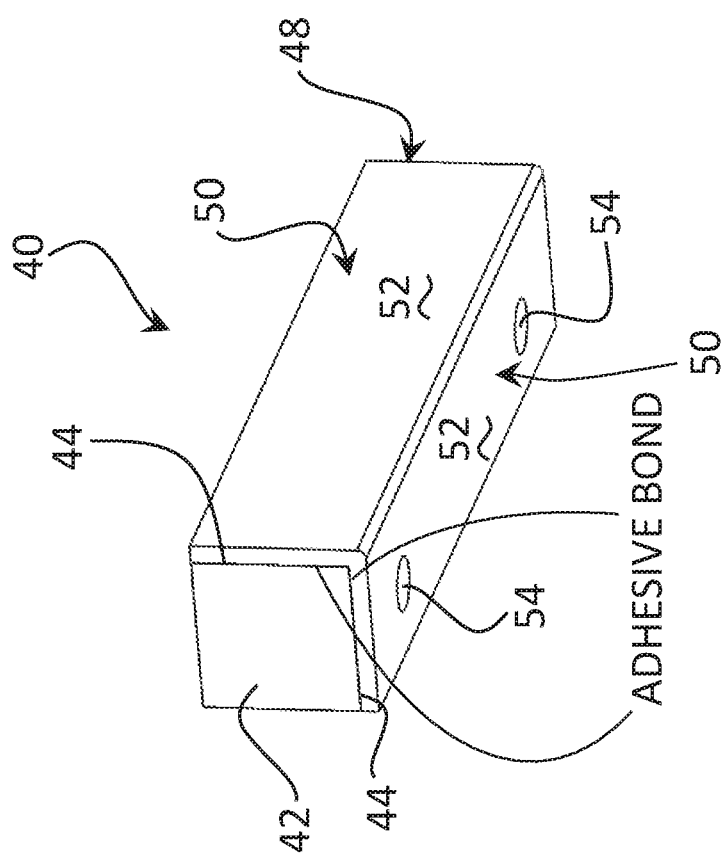
FIGS. 12-23 show perspective views of further examples of gibs constructed in accordance with the teachings of the present disclosure.
Figure 13:
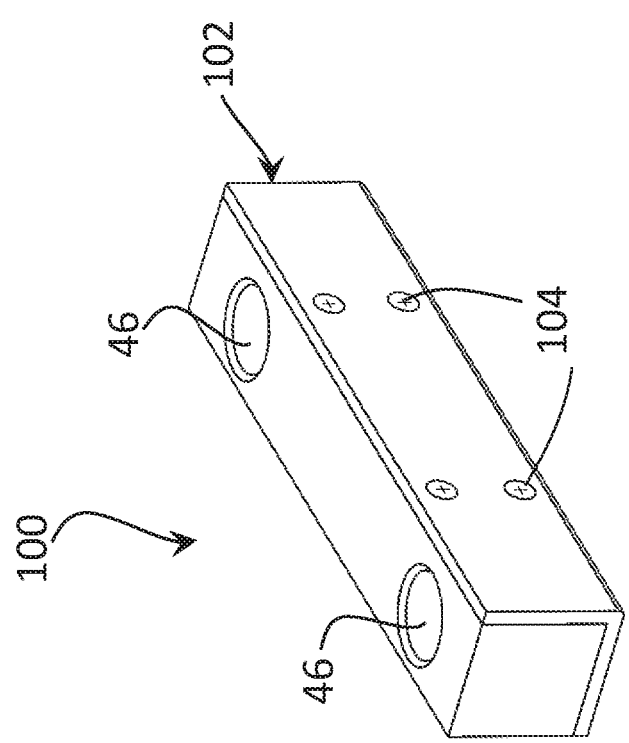

FIG. 12 illustrates the gib 40, with the attachment 48 bonded to the surfaces 44 of the gib body 42 via an adhesive. FIG. 13 illustrates a similar gib 100, but with an attachment 102 bonded to the gib substrate using mechanical fasteners 104 through the attachment.

Figure 14:
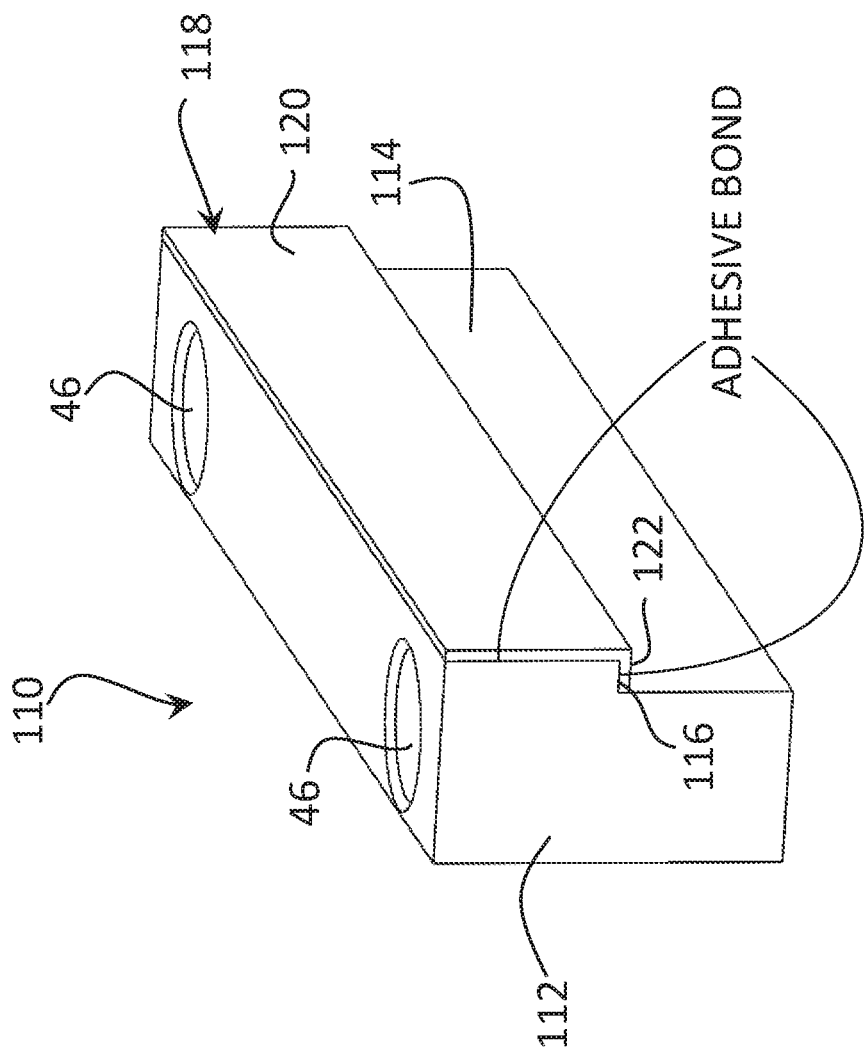
Figure 15:
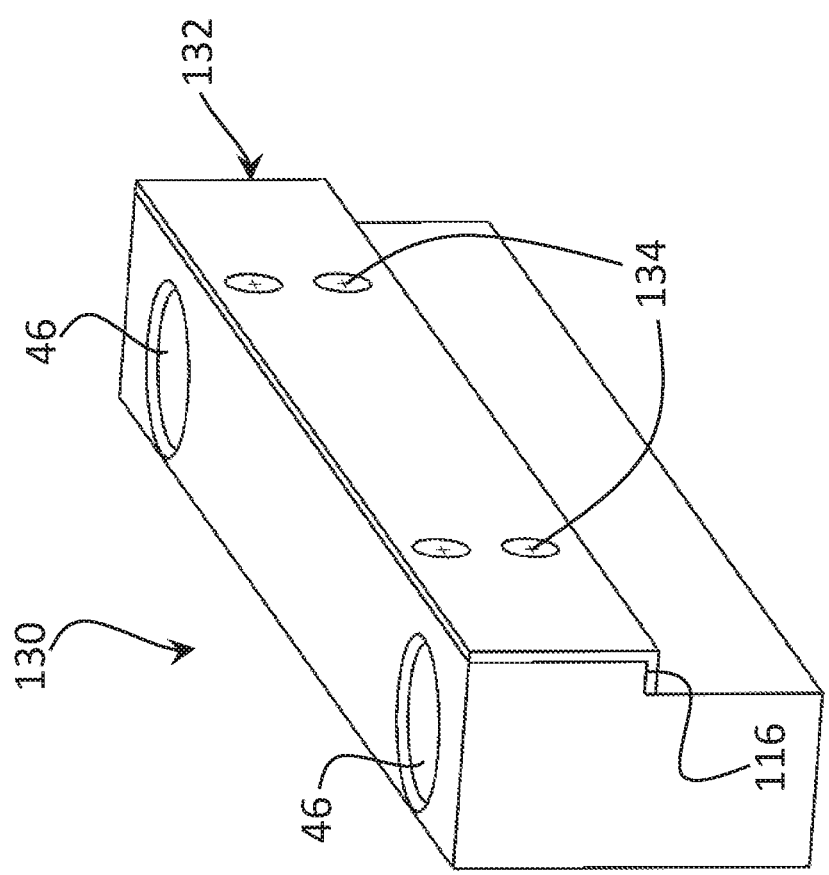

FIG. 14 illustrates another example of a gib 110 with a gib body 112 having one side surface 114 with a step 116. The gib 110 includes an attachment 118 with an L-shaped cross-section and with one longer section 120 covering a portion of the one side surface 114 and a much shorter section 122 covering the step 116. In this example, the attachment 118 is bonded to the gib substrate or body 112 using an adhesive. FIG. 15 illustrates a similar gib 130 having the same shaped gib substrate, but with an attachment 132 bonded to the gib substrate using fasteners 134, such as rivets.

Figure 16:
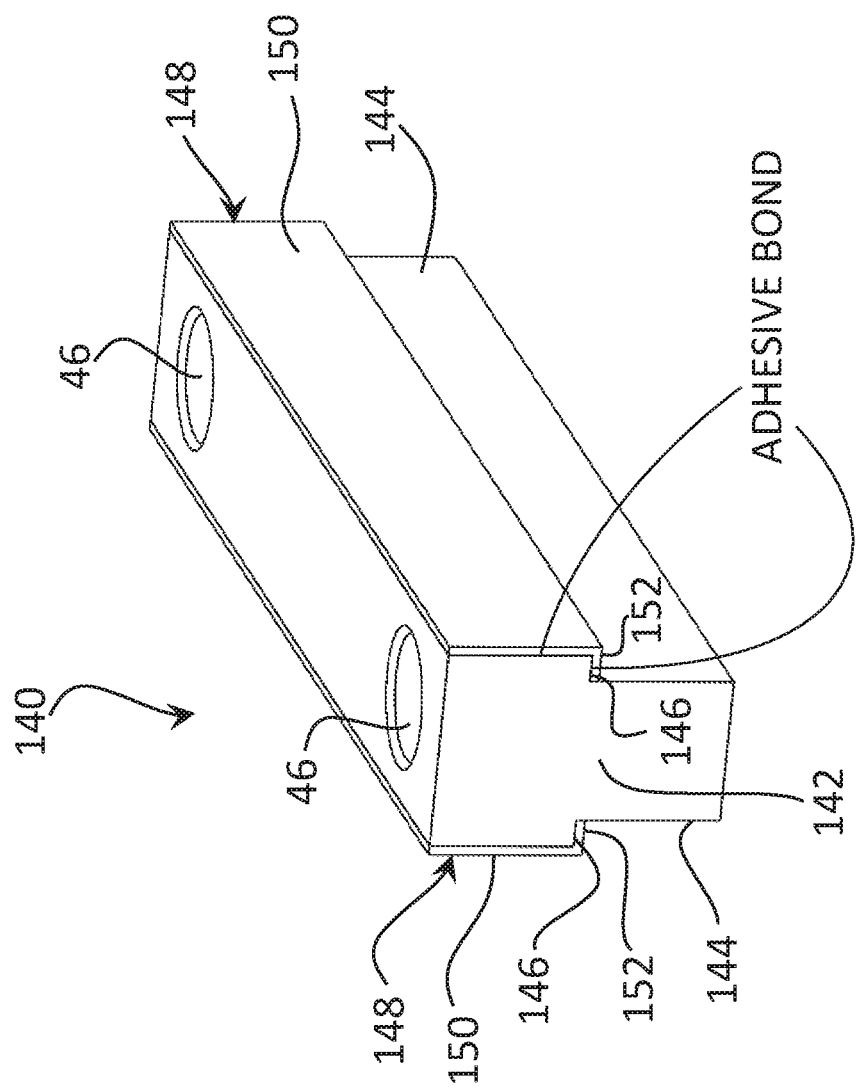
Figure 17:
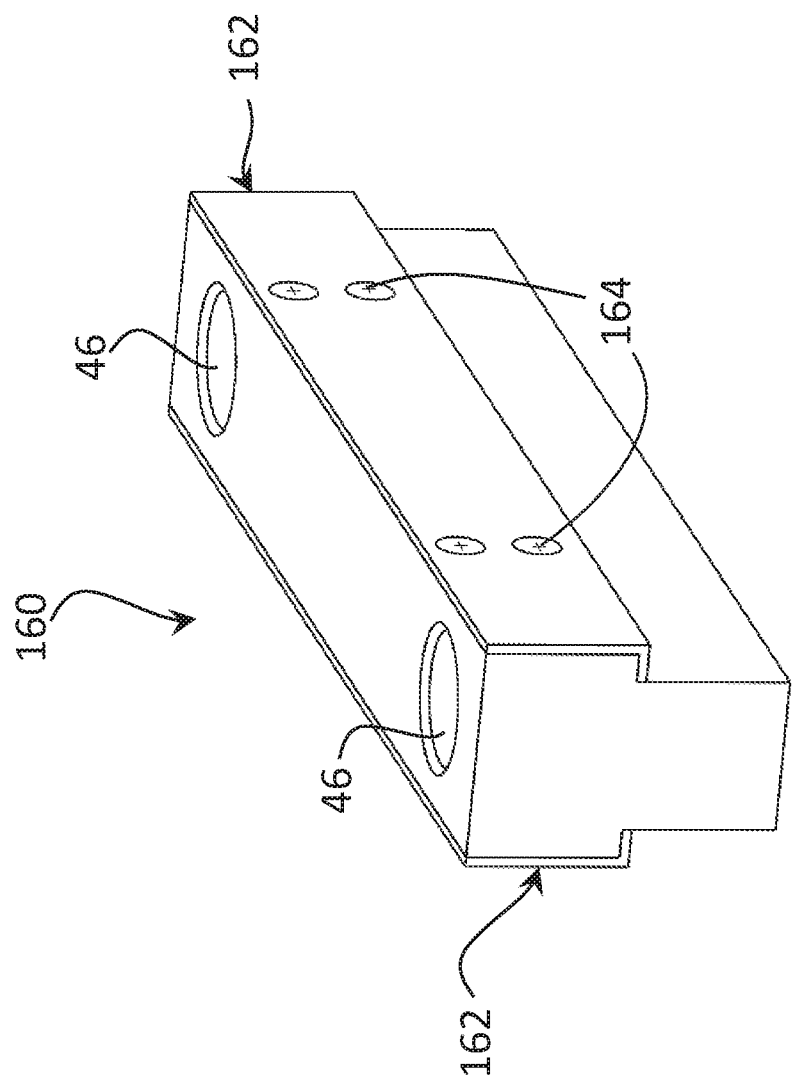

FIG. 16 illustrates another example of a gib 140 with a gib body 142 having two side surfaces 144 with a step 146. The gib 140 includes two attachments 148, each with an L-shaped cross-section and with one longer section 150 covering a portion of the one side surface 144 and a much shorter section 152 covering the step 146. In this example, the attachments 148 are bonded to the gib substrate or body 142 using an adhesive. FIG. 17 illustrates a similar gib 160 having the same shaped gib substrate, but with an attachment 162 bonded to the gib substrate using fasteners 164, such as rivets.

Figure 18:
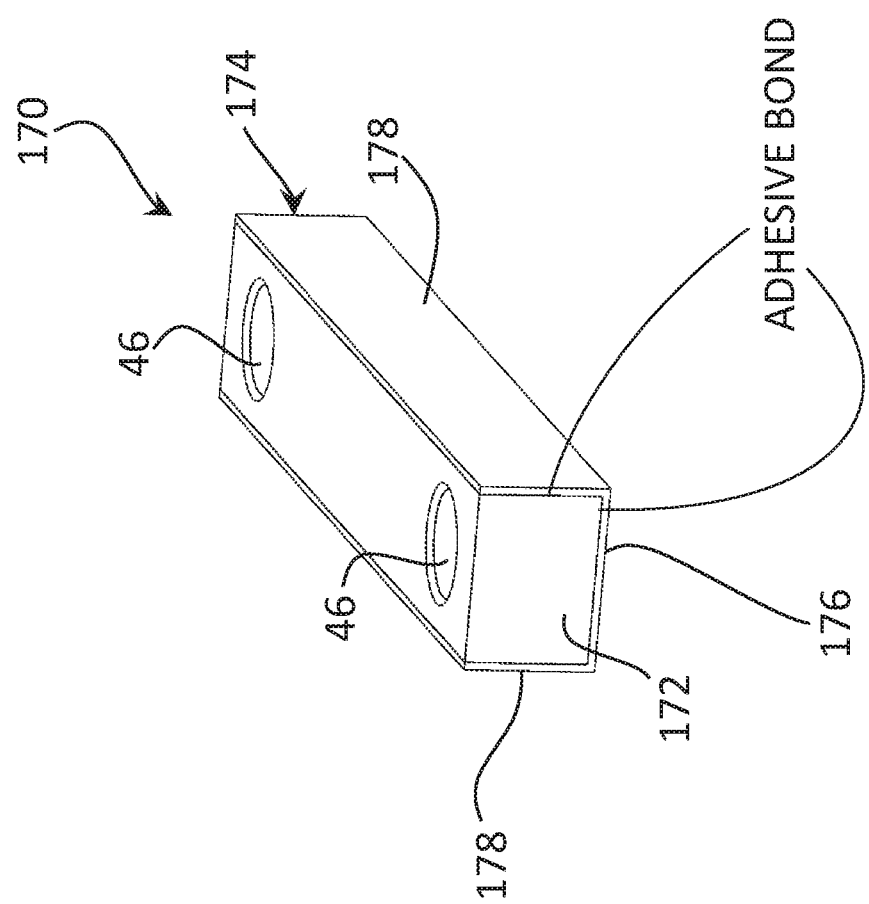
Figure 19:
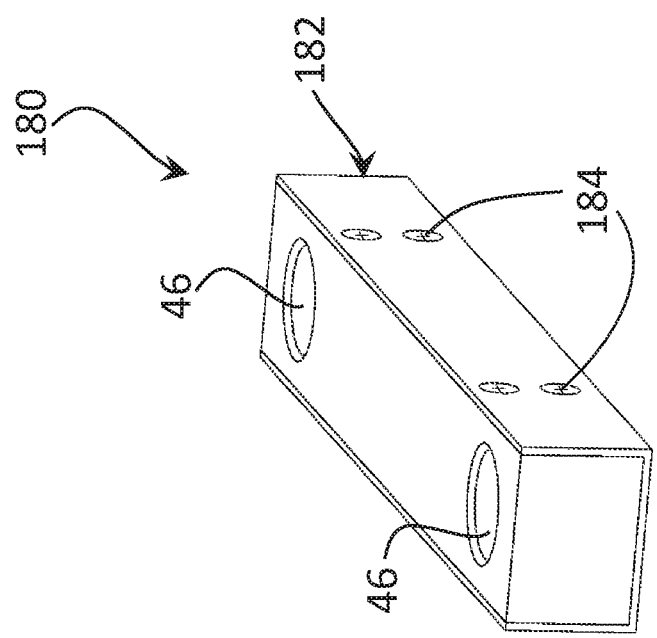

FIG. 18 illustrates another example of a gib 170 with a gib body 172 similar to the gib body 42 as described above. However, in this example, the gib 170 includes a U-shaped attachment 174 with three sections including a bottom section 176 overlying a bottom of the gib substrate or body 172 and two spaced apart side sections 178 overlying opposed sides of the body. In this example, the attachment 174 is bonded to the gib substrate or body 172 using an adhesive. FIG. 19 illustrates a similar gib 180 having the same shaped gib substrate, but with an attachment 182 bonded to the gib substrate using fasteners 184, such as rivets.

Figure 20:
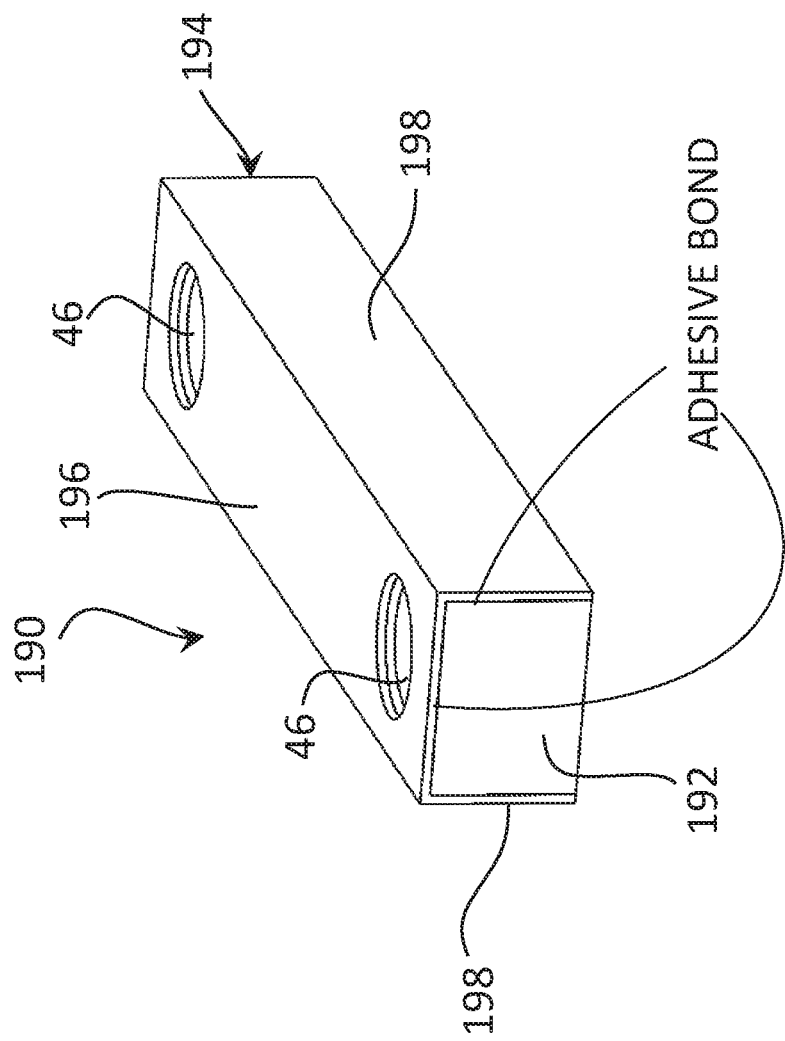
Figure 21:
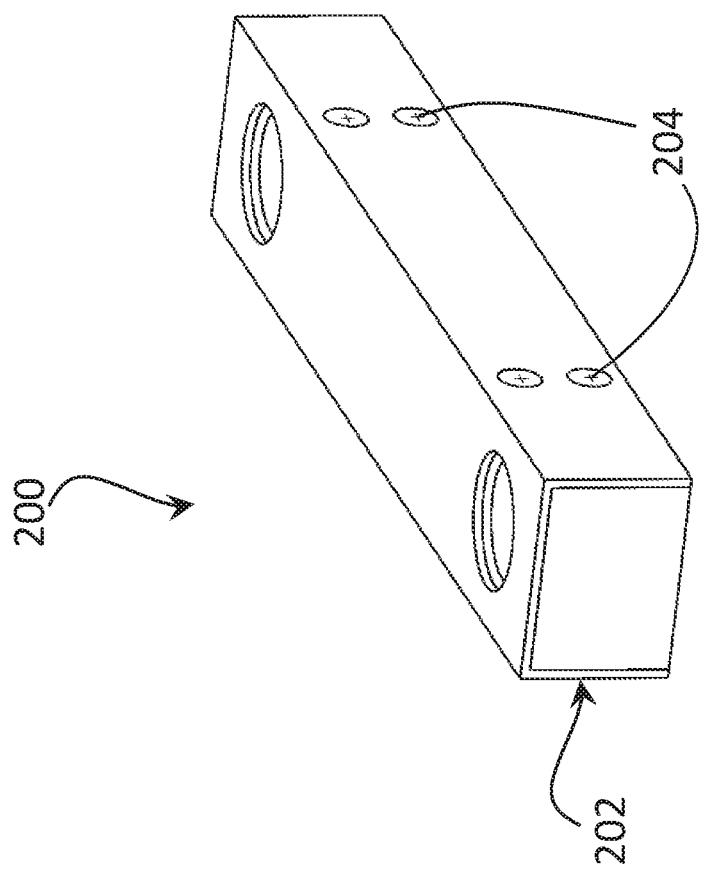

FIG. 20 illustrates another example of a gib 190 with a gib body 192 similar to the gib body 172 of the prior example. However, in this example, the gib 190 includes an inverted U-shaped attachment 194 with three sections including a top section 196 overlying a top of the gib substrate or body 192 and two spaced apart side sections 198 overlying the opposed sides of the body. In this example, the attachment 194 is bonded to the gib substrate or body 192 using an adhesive. FIG. 21 illustrates a similar gib 200 having the same shaped gib substrate, but with an attachment 202 bonded to the gib substrate using fasteners 204, such as rivets.

Figure 22:
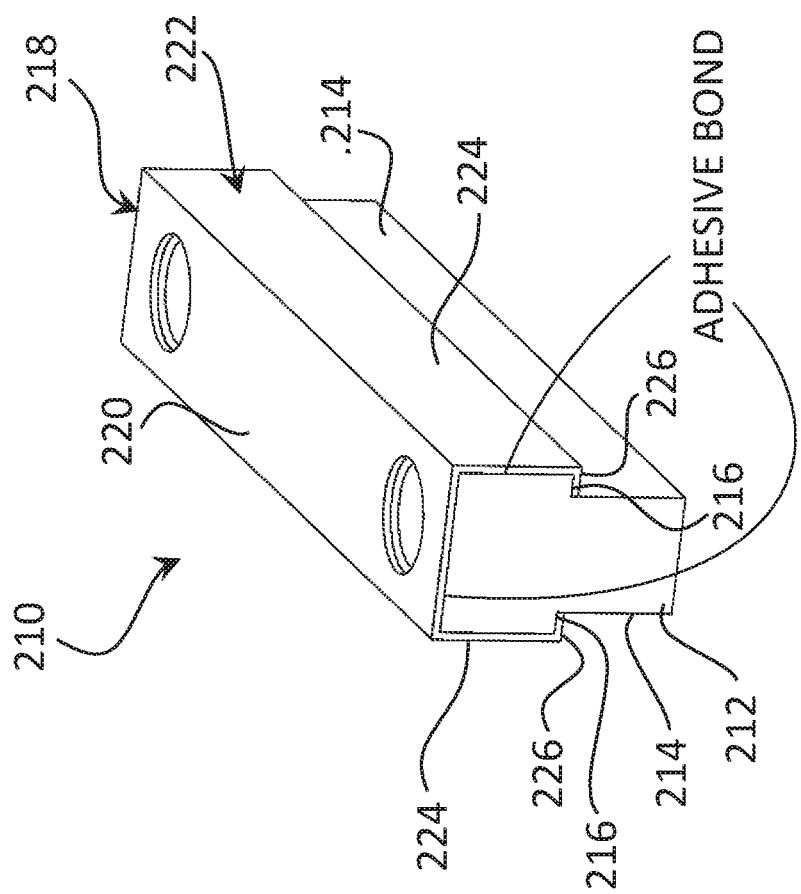
Figure 23:
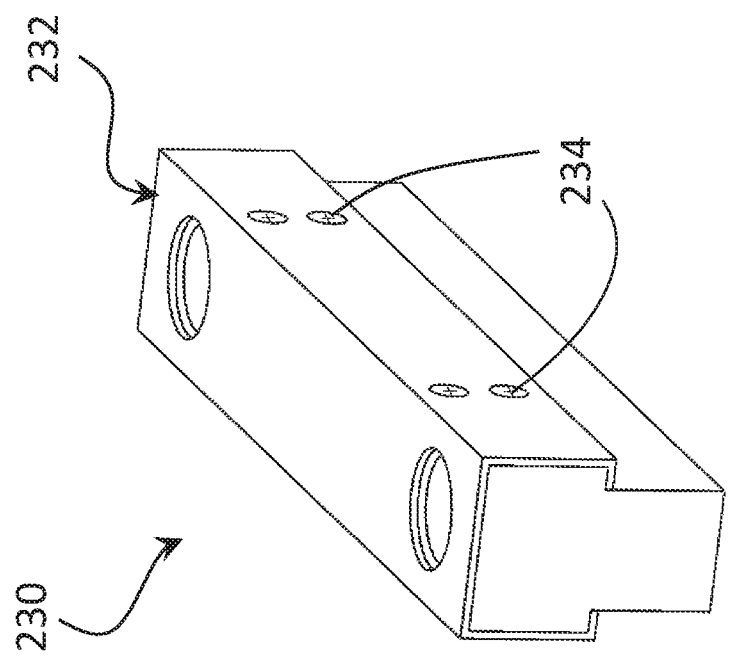

FIG. 22 illustrates another example of a gib 210 with a gib body 212 similar to the gib body of FIGS. 16 and 17 having two side surfaces 214 with a step 216. However, the gib 210 in this example includes one attachment 218 with a top section 220 and two side portions 222. Each side portion has L-shaped cross-section and with one longer section 224 covering a portion of the corresponding side surface 214 and a much shorter section 226 covering the step 216. In this example, the attachments 218 are bonded to the gib substrate or body 212 using an adhesive. FIG. 23 illustrates a similar gib 230 having the same shaped gib substrate, but with an attachment 232 bonded to the gib substrate using fasteners 234, such as rivets.

It should be apparent that the disclosure describes more than a novel improvement over current methodologies. The present disclosure describes a universal solution with its plurality of benefits. These benefits may relate to the disclosed gib's ability to operate within any injection mold environment, including but not limited to the varied range of mold temperatures, varied mold size, mass, and pressure requirements, clean or white room environments, and the like. It is the combination of the rigid substrate providing a robust foundation to support the various loads and the formed composite that excludes non-functional faces from interacting with motionable components. The many cost savings are also apparent as the disclosure eliminates the possibility of galling as there is no contact between motionable metallic components with any other metallic components whatsoever. More and significant cost savings are realized for the injection mold industry by eliminating all preventive maintenance as related to lubrication where a gib or gibs are required for function. Yet even more cost savings are derived by reducing the need for any lubrication consumption, chemical cleaning solvents, and their associated environmental impacts.

Although certain devices and methods have been described herein in accordance with the teachings of the present disclosure, the scope of coverage of this disclosure is not limited thereto. On the contrary, this disclosure covers all embodiments of the teachings of the disclosure that fairly fall within the scope of permissible equivalents.

What is claimed is:

1. A gib comprising:
   a metallic substrate having a first face and a second face; and
   an attachment disposed on the metallic substrate, the attachment including a first functional surface disposed on the first face of the metallic substrate, wherein the first functional surface is configured as a bearing surface,
   wherein the attachment is formed of a fabric resin composite material, and
   wherein the fabric resin composite further includes a second functional surface disposed on the second face of the metallic substrate, the second functional surface configured to be disposed adjacent to the first functional surface.

2. The gib of claim 1, wherein the gib is configured to facilitate or guide axial or linear motion relative to the gib when the fabric resin composite interacts with one or more motionable components without using a lubricant.

3. The gib of claim 1, wherein the first functional surface is configured as a guide surface and the second functional surface is configured as a retention surface.

4. The gib of claim 1, wherein the gib is for an injection mold tool.

5. The gib of claim 2, wherein the fabric resin composite includes edges configured to avoid contact with the motionable components.

6. The gib of claim 1, wherein the metallic substrate and the attachment are joined with a plurality of mechanical fasteners.

7. The gib of claim 1, wherein the metallic substrate and the attachment are bonded with an adhesive material.

8. The gib of claim 2, wherein there is no direct contact between the metallic substrate and the motionable components.

9. The gib of claim 1, wherein:
   the metallic substrate includes a third face disposed opposing the first functional surface;
   the second functional surface is configured to be flush with the third face of the metallic substrate; and
   an edge of the second functional surface is configured to be coplanar with the third face of the metallic substrate.

10. The gib of claim 1, wherein the first functional surface and the second functional surface are configured as one continuous form.

11. A method of reducing contamination within a manufacturing environment, the method comprising the steps of:
    mounting a gib including a metallic substrate having a first face as a guiding face and a second face as a retention face for motionable components, wherein the gib includes an attachment of a fabric resin composite disposed on the guiding face and on the retention face on the metallic substrate; and
    operating the motionable components without the application of any lubricants to the gib and the motionable components,
    wherein the attachment includes a first functional surface disposed on the first face of the metallic substrate, the first functional surface providing a bearing surface on the guiding face, and
    wherein the attachment includes a second functional surface disposed on the second face of the metallic substrate, the second functional surface disposed adjacent to the first functional surface.

12. A gib comprising:
    a metallic substrate having a first face and a second face; and
    an attachment disposed on the metallic substrate, the attachment including a first functional surface disposed on the first face and a second functional surface disposed on the second face of the metallic substrate,
    wherein the first functional surface is configured as a bearing surface,
    wherein the attachment is formed of a fabric resin composite material, and wherein the first functional surface and the second functional surface are configured as one continuous form.

* * * * *